United States Patent [19]

Schei

[11] Patent Number: 5,788,945
[45] Date of Patent: Aug. 4, 1998

[54] METHOD FOR REFINING OF SILICON

[75] Inventor: Anders Schei, Kristiansand, Norway

[73] Assignee: Elkem ASA, Norway

[21] Appl. No.: 852,999

[22] Filed: May 8, 1997

Related U.S. Application Data

[63] Continuation of Ser. No. 500,510, Jul. 11, 1995, abandoned.

[30] Foreign Application Priority Data

Sep. 1, 1994 [NO] Norway ................... 943227

[51] Int. Cl.$^6$ .................................. C01B 33/02
[52] U.S. Cl. .................. 423/348; 117/78; 117/80
[58] Field of Search .................. 423/348; 117/64, 117/65, 66, 67, 68, 78, 80

[56] References Cited

U.S. PATENT DOCUMENTS

| | | | |
|---|---|---|---|
| 4,312,848 | 1/1982 | Dawless | 423/348 |
| 4,388,286 | 6/1983 | Kapur et al. | 423/348 |
| 4,643,833 | 2/1987 | Aulich et al. | 423/348 |
| 4,828,814 | 5/1989 | Sanjurjo et al. | 423/348 |
| 5,182,091 | 1/1993 | Yuge et al. | 423/348 |

FOREIGN PATENT DOCUMENTS

| | | |
|---|---|---|
| 2556333 | 6/1985 | France . |
| 4122190 | 7/1991 | Germany . |
| 4-016504 | 1/1992 | Japan . |
| 4-037602 | 2/1992 | Japan . |
| 901150 | 3/1990 | Norway . |
| 8902415 | 3/1989 | WIPO . |

OTHER PUBLICATIONS

*Chemical Abstracts*, vol. 89, No. 8, 63030t, Aug. 21, 1978.

K. Suzuki and N. Sano, Thermodynamics for Removal of Boron From Metallurgical Silicon by Flux Treatment, Apr. 1991, pp. 273–275.

*Primary Examiner*—Steven Bos
*Assistant Examiner*—Stuart L. Hendrickson
*Attorney, Agent, or Firm*—Bierman, Muserlian and Lucas

[57] ABSTRACT

The present invention relates to a process for removing impurities from molten silicon by treatment of molten silicon contained in a vessel with a slag having the capability of removing the impurities, particularly boron from molten silicon wherein slag is continuously or substantially continuously added to the molten silicon and that the slag is continuously or substantially continuously inactivated or removed from the silicon melt as soon as equilibrium between the slag and molten silicon is reached with respect to the impurity elements or element to be removed.

9 Claims, 1 Drawing Sheet

METHOD FOR REFINING OF SILICON

This is a continuation of application Ser. No. 08/500,510 filed Jul. 11, 1995 now abandoned.

The present invention relates to a process for purifying metallurgical grade silicon, particularly to provide silicon for the manufacture of solar cells. More specifically the present invention relates to a process for removing impurities from molten silicon by slag treatment.

For a number of applications it is required silicon having a very low impurity level for a number of elements is required. Thus for solar cell silicon a silicon having a boron content below 0.4 ppmw and a phosphorus content below 0.7 ppmw is required.

A plurality of purifying processes and combinations of processes have been proposed in order to obtain solar silicon having the required low content of impurities. Thus in the publication "Thermodynamics for removal of boron from metallurgical silicon by flux treatment of molten silicon" by Suzuki and Sano published on the 10th European photovoltaic solar energy conference in Lisbon, Portugal, 8–12 Apr. 1991, removal of boron by flux or slag treatment is investigated. It was found that treatment of silicon with the slag systems $CaO-SiO_2$, $CaO-MgO-SiO_2$, $CaO-BaO-SiO_2$ and $CaO-CaF_2-SiO_2$ gave a maximum distribution coefficient of boron, defined as the ratio between ppmw B in slag and ppmw B in silicon, of about 2.0 when the slag system $CaO-BaO-SiO_2$ was used. It was further found that the boron distribution coefficient increases with increasing basicity of the slag, reaching a maximum and then decreases. The experiments made by Suzuki and Sano were carried out by placing 10 g of silicon and 10 g of slag in a graphite crucible, melting the mixture and keeping the mixture molten for two hours. The low distribution coefficient of boron between slag and molten silicon means that a high amount of slag has to be used and that the slag treatment has to be repeated a number of times in order to bring the boron content down from 20–100 ppm, which is the normal boron content of metallurgical silicon, to below 1 ppm, which is the required boron content for solar cell silicon. The process described in the paper of Sano and Suzuki is thus both very costly and time consuming.

In Norwegian patent application No 901150 a method for removal of boron from metallurgical grade silicon by slag treatment is described where molten silicon is treated with a slag comprising a chlorine containing compound. Preferably a $CaO-SiO_2-CaCl_2$ containing slag is used. The slag is added to molten silicon and heated whereafter the slag is removed. According to this process the boron content is reduced from about 15 ppm to about 5 ppm by using a slag to silicon weight ratio between 0.5 and 0.8.

In the slag treatment process described above the total amount of slag is kept in contact with molten silicon for a relatively long period of time.

The boron distribution coefficient, $L_B=2$ does not indicate that the slag extraction processes described above are efficient means for the removal of large contents of boron from silicon. The efficiency of the slag extraction may be estimated by some simplified theoretical arguments. Some symbols are defined:

$[B]^O$—The boron content of the ingoing silicon (ppmw)
$(B)^O$—The boron content of the ingoing slag (ppmw)
$[B]^P$—The boron content of the outgoing silicon (ppmw)
$(B)^P$—The boron content of the outgoing slag (ppmw)
$M_A$—The amount of silicon alloy (mass units, e.g. kg)
$M_S$—The amount of slag (mass units, e.g. kg)

$M_A$ and $M_S$ are assumed to be constant during the reaction. That will be a good approximation when the total content of boron in the system is low, and the exchange of matter between the two phases is small compared to the total mass of the system. If the amount to be exchanged is large, the situation will be more complex, but a similar calculation is possible. A real reaction will go towards equilibrium, but never reach it. For the present purpose it is assumed:

1. The boron distribution coefficient, $L_B$ is constant.
2. The establishment of equilibrium between slag and silicon is rapid at the interface, and any deviation from the overall equilibrium is due to the boron transport within the phases.
3. The ingoing alloy and slag materials are the only sources of boron, and no boron is lost from the system.

In the processes described above where all slag is added before any slag is removed and there is a long contact time between slag and molten silicon, the slag and the silicon will, at best, be homogeneous in equilibrium at the time the slag is removed from the silicon.

The potential of boron purification for the above slag treatment process where equilibrium is obtained between slag and silicon can be calculated as follows:

$$M_A[B]+M_S(B)=M_A[B]^O+M_S(B)^O$$

By combining this equation with the equation:

$$L_B = \frac{ppmw\ B\ in\ slag}{ppmw\ B\ in\ silicon}$$

and rearrangement, the boron content of the outgoing silicon can be calculated as:

$$[B]^P = \frac{[B]^O + \frac{M_S}{M_A}(B)^O}{1 + \frac{M_S}{M_A}L_B}$$

This equation gives the boron content of slag treated silicon as function of slag consumption per unit of metallurgical silicon. The impurity content of slag materials sets the limit for the purity that can be obtained for the silicon, this limit being:

$$[B]^P \to \frac{(B)^O}{L_B} \text{ for } \frac{M_S}{M_A} \to \infty$$

The change of the boron content during a slag treatment process where the slag and silicon are allowed to reach equilibrium is shown in FIG. 1. It can be seen from FIG. 1 that in order to reach a boron content of about 1 ppmw in silicon originally containing about 10 ppmw it is necessary to use a slag to silicon ratio well above 3. Thus a large amount of slag has to be used in order to obtain a boron content below 1 ppmw when using the conventional slag extraction process.

It is an object of the present invention to provide a slag treatment process for removing impurities from silicon, particularly boron, which makes it possible to obtain an improved refining efficiency compared with the prior art processes.

Accordingly, the present invention relates to a process for removing impurities from molten silicon by treatment of molten silicon contained in a vessel with a slag having the capability of removing boron and/or other impurities from molten silicon, said process being characterized in that the slag is continuously or substantially continuously added to the molten silicon and that the slag is continuously or substantially continuously inactivated or removed from the silicon melt as soon as equilibrium between the slag and molten silicon with respect to the impurity elements or element to be removed, is reached.

According to one embodiment of the present invention the slag is inactivated by adding one or more ingredients to the slag which increases the density of the slag in order to obtain a slag which settles on the bottom of the vessel in which the slag treatment is carried out. Preferably, barium compounds and/or strontium compounds are used as ingredients for increasing the density of the slag.

In order to further inactivate the slag which settles in a slag layer at the bottom of the vessel in which the treatment is carried out, the temperature in the slag layer is reduced by means of suitable cooling means arranged in the lower part of the vessel. Thus the lower part of the vessel may be equipped with cooling pipes intended for circulation of a cooling fluid.

According to another embodiment slag having a higher density then molten silicon is continuously or substantially continuously added to the top of the molten silicon bath and continuously or substantially continuously tapped from the bottom of the vessel where the treatment is carried out.

According to yet another embodiment slag having a lower density than molten silicon is continuously or substantially continuously supplied to the molten silicon through the bottom or through the lower part of the vessel containing the molten silicon whereby the slag will rise to the top of the molten silicon where the slag is continuously or substantially continuously removed from the vessel. Slag based on $Na_2O$—$SiO_2$ is an example of slag having a lower density then silicon.

According to another embodiment of the process according to the present invention, the slag treatment is carried out with a countercurrent flow of slag and silicon. The countercurrent flow of slag and silicon can either be carried out continuously in one vessel or alternatively in two or more vessels by moving the molten silicon and molten slag in countercurrent flow through the two or more vessels. In this way slag having the lowest content of the impurities which are to be extracted from the silicon to the slag, is contacted with silicon having the lowest content of these impurities. The slag consumption is thus further reduced.

It has been found that the slag consumption can be greatly reduced by the process of the present invention compared to the processes where the total amount of slag is brought to equilibrium with the silicon.

Any conventional slag composition used for refining silicon can be used in the process of the present invention. A preferred slag comprises CaO—$SiO_2$, but other known slags can also be used.

When the slag in accordance with the process of the present invention is added continuously or substantially continuously and continuously or substantially continuously inactivated or removed from the silicon melt, the material balance for a small amount, $dM_S$, of slag added to the silicon will be:

$$M_A d[B] = ((B)^o - (B)) dM_S$$

If this equation is combined with the equation for the boron distribution coefficient, $L_B$ and solved with appropriate boundary conditions it is found that the boron content of the outgoing silicon can be calculated as:

$$[B]^p = \frac{(B)^o}{L_B} + \left( [B]^p - \frac{(B)^o}{L_B} \right) \exp\left( -\frac{M_S}{M_A} L_B \right)$$

The impurity content of the slag materials sets the same limit for the purity that can be obtained for the treated silicon as the purity which can be obtained according to the prior art method with equilibrium between slag and silicon. However, as can be seen from FIG. 1, the change in boron content in the molten silicon during the slag treatment is much faster with the method of the present invention than with the prior art methods. Thus it can be seen from FIG. 1 that a boron content less than about 0.5 ppmw can be obtained by treating silicon having a boron content of 10-50 ppmw with a slag to silicon weight ratio of less than 3.

The process of the present invention can be carried out in any suitable apparatus comprising at least one vessel for containing molten silicon and slag and having means for adding liquid slag to the top of the silicon melt or at the bottom of the silicon melt. The vessel must further be equipped with heating means for melting silicon and keeping the melt at a preset temperature. Suitable apparatuses for carrying out the process of the present invention include arc furnaces, plasma heated furnaces, induction heated furnaces and resistance heated furnaces.

BRIEF DESCRIPTION OF THE DRAWINGS

The method of the present invention will now be further described by way of examples and with reference to the accompanying drawings.

In FIG. 2 an arc furnace 1 is shown comprising a graphite crucible 2 having a volume of 50 $dm^3$ equipped with an electrode 3 for melting silicon 4 and slag materials. The furnace 1 is further equipped with means 5 for continuously supplying slag to the furnace. The furnace has a maximum load of 70 kW. In order to inactivate the slag the furnace has a rather poor heat insulation at the bottom.

EXAMPLE 1

(Present invention)

Figure 1:
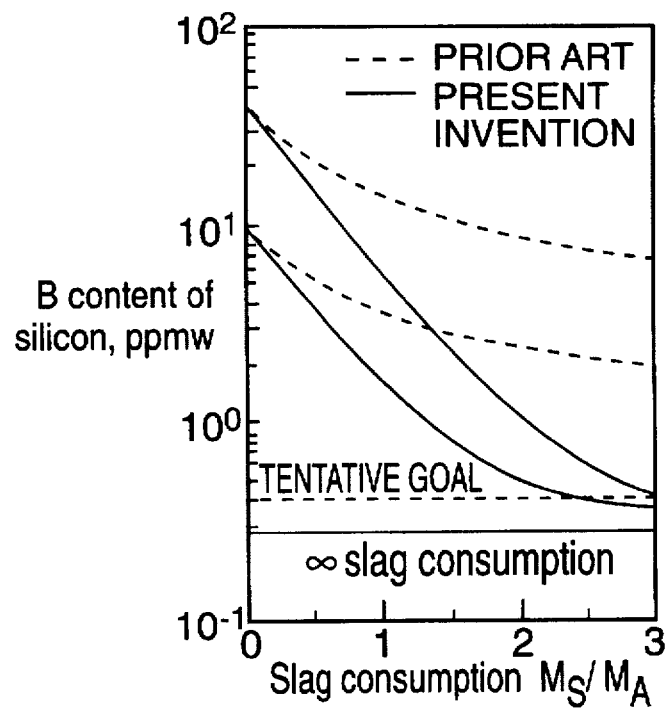
FIG. 1 is a diagram showing theoretical boron extraction from silicon as a function of slag consumption for the method of the present invention (marked "present invention") and for the method described above where the total amount of slag is kept in contact with molten silicon for a relatively long period of time (marked "prior art"). According to the prior art a boron distribution coefficient of $L_B=2.0$ has been used in calculating the theoretical boron extraction.
Figure 2:
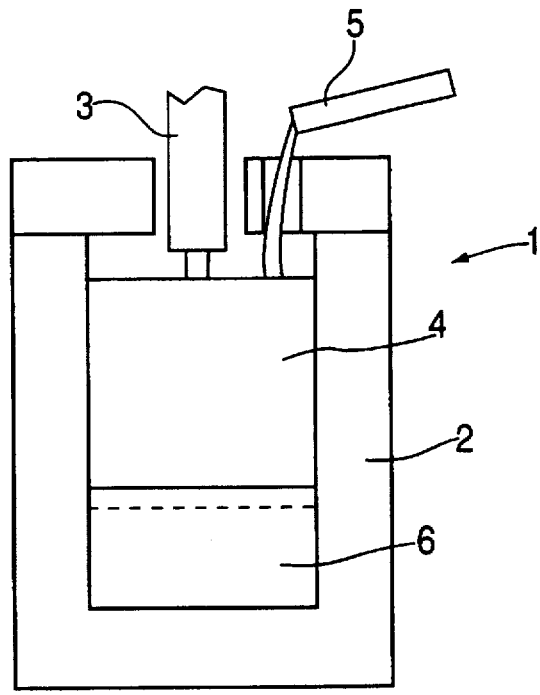
FIG. 2 shows an arc furnace for slag extraction of boron from molten silicon used in carrying out the method of the present invention.

20 kilogram of silicon containing 40 ppmw boron was melted in the furnace 1. 40 kilogram of a low boron slag having a composition of 60% by weight CaO and 40% by weight $SiO_2$ was added continuously to the silicon through the slag supply means 5, while heat was added at a rate that gave almost instantaneous melting. The melting was verified by probing into the furnace. The density of the slag was higher than the density of silicon thus causing the slag to settle in a slag layer 6 below the silicon layer in the furnace. After finishing the slag addition, the refined silicon was tapped from the furnace 1. The mean load during the test was 58.5 KW.

The boron content of the refined silicon was approximately 1 ppmw and as can be seen from FIG. 1, this is very close to the theoretical value obtainable for the method according to the present invention.

EXAMPLE 2

(Prior art)

For comparison purposes a test was made where 40 kilogram of slag having the same composition as in example 1 was melted in the furnace 1 whereafter 20 kilogram of silicon containing 40 ppmw boron was added continuously to the molten slag, while the charge was heated at a rate that gave almost instantaneous melting. The two melts were kept in contact for about half an hour after completed melting, whereafter the silicon was tapped from the furnace. The boron content of the silicon was 11 ppmw, which is slightly above the theoretical value of the prior art process shown in FIG. 1. The mean load during the test was 65.7 KW.

This comparison example shows a high degree of equilibration between the silicon and the bottom slag, which indicates a weak inactivation of the slag. Since the cooling through the bottom lining is fairly constant, the load gives an indication of the cooling which will take place in the bottom slag layer. The test was repeated with a lower load of 53.4 KW. The boron content of silicon then became 20 ppmw, which is much higher than the theoretical value of prior art in FIG. 1.

Example 1 compared with Example 2 shows that the process of the present invention gives a strongly increased boron removal compared to the process according to the state of art.

I claim:

1. In a slag refining process for removing impurities from molten silicon in a vessel with a slag having the capability of removing impurities from said molten silicon, the improvement comprising the steps of:
   (a) continuously or substantially continuously adding slag to one end of said vessel to form a slag phase in said vessel such that impurities in said molten silicon move from said molten silicon to said slag, thereby obtaining an equilibrium between impurities in said molten silicon and said slag; and
   (b) continuously or substantially continuously inactivating said slag and moving said slat to the other end of said vessel or continuously or substantially continuously removing said slag from the other end of said vessel as soon as said equilibrium between the slag and molten silicon is reached.

2. Process according to claim 1, wherein the slag is inactivated by adding one or more ingredients to the slag which increases the density of the slag.

3. Process according to claim 2, wherein said one or more ingredients added to the slag in order to increase the density of the slag is selected from the group consisting of barium compounds, strontium compounds, and barium compounds and strontium compounds.

4. Process according to claim 1, wherein the slag treatment is carried out with a countercurrent flow of slag and silicon.

5. Process according to claim 4, wherein the countercurrent flow of slag and silicon is carried out by moving both the molten silicon and slag in countercurrent flow through two or more vessels.

6. In a slag refining process for removing impurities from molten silicon in a vessel with a slag having the capability of removing impurities from said molten silicon, the improvement wherein the slag has a density greater than molten silicon, and said slag is continuously or substantially continuously added to the top of the silicon melt, and is continuously or substantially continuously removed from the bottom of the vessel.

7. Process according to claim 6, wherein the slag has a density greater than molten silicon, and said slag is continuously or substantially continuously added to the top of the silicon melt, and settles as a slag layer at the bottom of the vessel.

8. Process according to claim 7, wherein the slag layer at the bottom of the vessel is kept at a lower temperature than the silicon melt.

9. In a slag refining process for removing impurities from molten silicon in a vessel with a slag having the capability of removing impurities from said molten silicon, the improvement wherein the slag has a density less than silicon, and said slag is supplied to the molten silicon bath through the bottom or through the lower part of the wall of the vessel containing the molten silicon, and the slag rises to the top of the molten silicon bath where said slag is continuously or substantially continuously removed.

* * * * *